April 30, 1935.  I. E. LITTEN  1,999,506

LAWN MOWER ATTACHMENT

Filed Oct. 30, 1933

INVENTOR
I. E. LITTEN
BY Hazard and Miller
ATTORNEYS

Patented Apr. 30, 1935

1,999,506

UNITED STATES PATENT OFFICE 1,999,506

LAWN MOWER ATTACHMENT

Ira E. Litten, Santa Ana, Calif., assignor of one-fourth to Joseph H. Stout and one-fourth to John Knox, both of Santa Ana, Calif.

Application October 30, 1933, Serial No. 695,860

1 Claim. (Cl. 56—294)

My invention relates to a lawn mower attachment.

It is an object of this invention to provide a lawn mower having revolving cutter blades with a stationary bar provided with downwardly and forwardly extending fingers to dig up weeds, especially Bermuda grass, and to guide them in position for being cut.

With the above and other objects in view, which will appear as the description proceeds, my invention consists in the construction and arrangement of parts hereinafter described and claimed.

In the accompanying drawing, which forms a part of this specification, I have illustrated a preferred embodiment of my invention, and in which.

Figure 1:
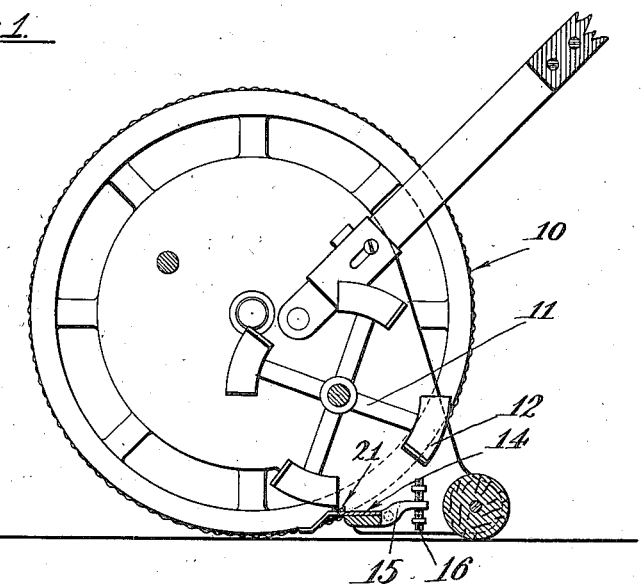
Fig. 1 is a vertical cross section of a lawn mower, non-essential parts being omitted, and only a portion of the handle being shown, to which my invention is applied.
Figure 2:
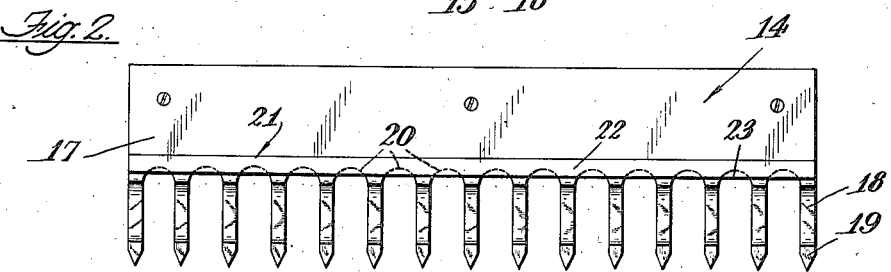
Fig. 2 is a top plan view of the stationary cutter bar.
Figure 3:
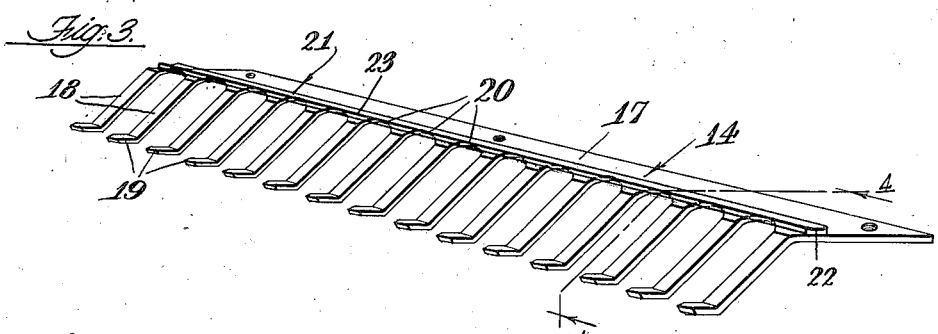
Fig. 3 is a perspective view of the cutter bar in Fig. 2.
Figure 4:
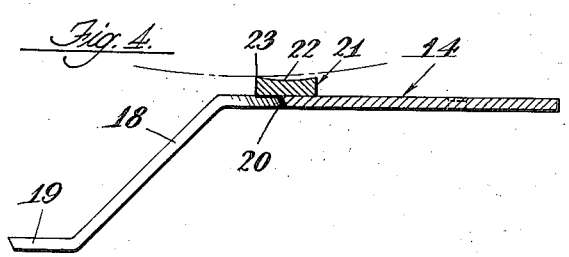
Fig. 4 is a section on the line 4—4 of Fig. 3 on a somewhat enlarged scale.

Referring to the drawing, 10 indicates a conventional lawn mower provided with a revolving cutter head 11 carrying its series of spaced helical cutter blades 12. The mechanism for revolving the cutter head 11 is not shown as it forms no part of this invention. 14 indicates an improved stationary cutter bar suitably secured to supporting members 15 which may be angularly adjusted by means of a screw bolt 16.

This stationary cutter bar 14, which is the subject of this invention, consists of a flat upper section 17, from which a series of spaced parallel downwardly and forwardly extending fingers 18 project. The extreme forward ends of the fingers 18 are pointed as at 19 and are substantially parallel to the flat upper section 17. Between each pair of adjacent fingers 18 a semi-circular recess 20 is provided in a flat portion 17 of the cutter bar. A knife blade 21, is suitably secured as by welding, to the cutter bar 14 and extends along the flat upper section 17, overlapping the rear portions of the recesses 20. The knife blade is preferably hollow ground on top 22, so as to provide a sharp edge 23, along which the cutter blades 12 pass in their revolution to cut the grass. The knife blade 21 projects in front of the recesses 20, in order to minimize the friction or drag of the Bermuda grass as the cutter bar 14 passes through it.

The operation of the cutter bar is obvious. It is angularly adjusted by means of the bolt 16 to the closeness of the cut desired. The fingers 18, with their pointed ends, will dig up weeds like Bermuda grass that grow closely to the ground and raise them up in position to slide between the fingers 18 into the recesses 20 adjacent the line of cutting formed by the knife blade 21 and the revolving cutter blades 12.

My apparatus, besides being especially adapted for digging up and cutting the Bermuda grass, acts also as a soil renovator or agitator in stirring up the surface of the ground with the result that air, light, and water more readily come in contact with the earth, thereby stimulating the growth of lawn grass and improving the appearance thereof.

Various changes may be made by those skilled in the art in the construction and arrangement of parts without departing from the spirit of my invention as claimed.

I claim:

In a lawn mower, the combination with a cutter head having a series of spaced helical cutter blades, of a stationary cutter bar having a flat section and a series of spaced parallel pointed fingers integral therewith and extending downwardly and forwardly therefrom, the extreme forward portions of the fingers being parallel to the flat section, said flat section being provided with recesses between the base of the fingers, and a knife blade secured to the forward end of the flat section and covering the rear portion of said recesses.

IRA E. LITTEN.